(12) United States Patent
Solbrig et al.

(10) Patent No.: US 9,238,991 B2
(45) Date of Patent: Jan. 19, 2016

(54) INTERNAL COMBUSTION ENGINE AND EXHAUST AFTERTREATMENT SYSTEM

(71) Applicant: GM GLOBAL TECHNOLOGY OPERATIONS LLC, Detroit, MI (US)

(72) Inventors: Charles E. Solbrig, Ypsilanti, MI (US); Ognyan N. Yanakiev, Canton, MI (US); Melanie K. Corrigan, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 14/258,084

(22) Filed: Apr. 22, 2014

(65) Prior Publication Data

US 2014/0318112 A1     Oct. 30, 2014

Related U.S. Application Data

(60) Provisional application No. 61/817,068, filed on Apr. 29, 2013.

(51) Int. Cl.
*F01N 13/08*     (2010.01)
*F01N 3/20*     (2006.01)

(52) U.S. Cl.
CPC ............ *F01N 13/08* (2013.01); *F01N 3/208* (2013.01); *F01N 2240/20* (2013.01); *F01N 2610/03* (2013.01); *F01N 2610/1453* (2013.01)

(58) Field of Classification Search
CPC .......... F01N 1/08; F01N 1/083; F01N 3/2892; F01N 2240/20; F01N 2470/08; B01F 5/0451; B01F 5/0647; B01F 5/0654
See application file for complete search history.

(56) References Cited

U.S. PATENT DOCUMENTS

2012/0216513 A1*   8/2012   Greber et al. .................. 60/295

FOREIGN PATENT DOCUMENTS

WO    WO 2010146285 A1 * 12/2010

* cited by examiner

*Primary Examiner* — Kenneth Bomberg
*Assistant Examiner* — Jonathan Matthias
(74) *Attorney, Agent, or Firm* — Cantor Colburn LLP

(57) ABSTRACT

An internal combustion engine has an exhaust treatment system with a fluid injection system and a swirl can plenum mixer for mixing injected fluid with exhaust gas exhausted from the engine. The mixer comprises a canister having an inner plenum. A bulkhead separates the inner plenum into an exhaust gas collector and a diffuser chamber. A flow port opens through the bulkhead to a tangential flow director on the downstream side of the bulkhead to collect the exhaust gas. A fluid injector port receives a fluid injector for dispensing a fluid into the exhaust gas for mixing with the exhaust gas in the swirl can plenum mixer. A tangential flow director nozzle is configured to dispense the exhaust gas and fluid into the downstream plenum in a tangential flow trajectory, wherein mixing and vaporization of the exhaust gas and fluid mixture with the exhaust gas is accomplished.

17 Claims, 5 Drawing Sheets

INTERNAL COMBUSTION ENGINE AND EXHAUST AFTERTREATMENT SYSTEM

CROSS-REFERENCES TO RELATED APPLICATIONS

This patent application claims priority to U.S. Patent Application Ser. No. 61/817068 filed Apr. 29, 2013 which is hereby incorporated herein by reference in its entirety.

FIELD OF THE INVENTION

Exemplary embodiments of the invention relate to exhaust treatment systems for internal combustion engines and, more particularly, to exhaust treatment systems that fully mix and vaporize fluids injected into an exhaust gas flow in a short physical length.

BACKGROUND

The exhaust gas emitted to an exhaust treatment system from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter. Catalyst compositions, typically disposed on catalyst supports or substrates, are provided in various exhaust system devices to convert certain, or all of these exhaust constituents into non-regulated exhaust gas components.

An exhaust treatment technology in use for high levels of particulate matter reduction, particularly in diesel engines, is the Particulate Filter ("PF") device. There are several known filter structures used in PF devices that have displayed effectiveness in removing the particulate matter from the exhaust gas such as ceramic honeycomb wall flow filters, wound or packed fiber filters, open cell foams, sintered metal fibers, etc. Ceramic wall flow filters have experienced significant acceptance in automotive applications.

The filter in a PF device is a physical structure for removing particulates from exhaust gas and, as a result, the accumulation of filtered particulates will have the effect of increasing the exhaust system backpressure experienced by the engine. To address backpressure increases caused by the accumulation of exhaust gas particulates, the PF device is periodically cleaned, or regenerated. The regeneration operation burns off the carbon and particulate matter collected in the filter substrate and regenerates the PF device.

Regeneration of a PF device in vehicle applications is typically automatic and is controlled by an engine or other controller based on signals generated by engine and exhaust system sensors such as temperature sensors and back pressure sensors. The regeneration event involves increasing the temperature of the PF device to levels that are often above 600C in order to burn the accumulated particulates.

One method of generating the temperatures required in the exhaust system for regeneration of the PF device is to deliver unburned HC (often in the form of raw fuel) to an oxidation catalyst ("OC") device disposed upstream of the PF device. The HC may be delivered by injecting fuel (either as a liquid or pre-vaporized) directly into the exhaust gas using an HC injector/vaporizer. The HC is oxidized in the OC device resulting in an exothermic reaction that raises the temperature of the exhaust gas. The heated exhaust gas travels downstream to the PF device to thereby burn (oxidize) the particulate accumulation.

A challenge for designers, especially those involved in space limited automotive applications, is that injecting fluids such as HC into the exhaust gas upstream of an OC device, or any other device for that matter, must allow for sufficient residence time, turbulence and distance in the exhaust flow for the injected fluid to become sufficiently mixed with and vaporized in the exhaust gas prior to entering the device. Without proper preparation, the injected fluid will not properly oxidize in the OC device and some unburned HC may pass through the device. The result is wasted fuel passing through the exhaust treatment system and uneven temperatures within the devices. Turbulators (i.e. static mixers) or other mixing devices may be installed in an exhaust conduit that fluidly connects the various exhaust treatment devices to aide in mixing the injected fluid. Such mixing devices, while effective, may add undesirable backpressure to the exhaust treatment system, reducing engine performance.

A technology that has been developed to reduce the levels of $NO_x$ emissions in lean-burn engines (ex. diesel engines) that burn fuel in excess oxygen includes a Selective Catalytic Reduction ("SCR") device. An SCR catalyst composition disposed in the SCR device preferably contains a zeolite and one or more base metal components such as iron ("Fe"), cobalt ("Co"), copper ("Cu") or vanadium ("V") which can operate efficiently to reduce $NO_x$ constituents in the exhaust gas in the presence of a reductant such as ammonia ("$NH_3$"). The SCR catalyst may be applied as a wash coat to either a conventional flow-through substrate or on the substrate of a particulate filter. The reductant is typically delivered as a liquid upstream of the SCR device, in a manner similar to the HC discussed above, and travels downstream to the SCR device to interact with the SCR catalyst composition; reducing the levels of $NO_x$ in the exhaust gas passing through the SCR device. Like the HC discussed above, without proper mixing and evaporation, the injected reductant, urea or ammonia for instance, will not properly function in the SCR device and some of the fluid may pass through the device resulting in wasted reductant as well as reduced $NO_x$ conversion efficiency.

Typical exhaust treatment systems may include several exhaust treatment devices as described above. In many instances, whether historical or not, the devices may comprise individual components that are serially disposed along an exhaust conduit that extends from the exhaust manifold outlet of the internal combustion engine to the tailpipe outlet of the exhaust treatment system. A challenge with this configuration is that it is necessary to choose a reasonable length between components, as well as sufficient mixing devices disposed within the exhaust conduit, to achieve adequate mixing of injected fluids (ex. HC and Urea (ammonia) reductant). As vehicle architectures become smaller, the desired length for an exhaust treatment system may not necessarily be available.

Accordingly it is desirable to provide an apparatus that will achieve uniform mixing and distribution of a fluid injected into the exhaust gas in an exhaust treatment system in a compact distance.

SUMMARY

An internal combustion engine has an exhaust treatment system with a fluid injection system and a swirl can plenum mixer for mixing injected fluid with exhaust gas exhausted from the engine. The swirl can plenum mixer comprises a canister having an inlet and an outlet, an inner exhaust gas plenum, a bulkhead separating the inner exhaust gas plenum into an upstream exhaust gas collector and a downstream diffuser chamber. A primary flow port opens through the bulkhead to a tangential flow director disposed about, and in fluid communication with, the primary flow port on the downstream side of the bulkhead to collect the exhaust gas passing through the primary flow port. A fluid injector port is configured to receive a fluid injector for dispensing a fluid into the exhaust gas for mixing with the exhaust gas in the swirl can plenum mixer. A tangential flow director nozzle is configured to dispense the exhaust gas and fluid, through an outlet, into the downstream diffuser plenum in a tangential flow trajectory, wherein mixing and vaporization of the exhaust gas/ and fluid is accomplished through ejection of the exhaust gas/ fluid mixture from the tangential flow director nozzle and subsequent expansion, deceleration and residence time of the mixture in the downstream diffuser chamber prior to exiting the swirl can plenum mixer canister through an outlet.

A swirl can plenum mixer for mixing injected fluid with exhaust gas exhausted from an internal combustion engine comprises a canister having an inlet and an outlet, an exhaust gas plenum, a bulkhead separating the exhaust gas plenum into an upstream exhaust gas collector and a downstream diffuser chamber, a primary flow port opening through the bulkhead, a tangential flow director disposed about, and in fluid communication with, the primary flow port on the downstream side of the bulkhead to collect the exhaust gas passing through the primary flow port, a fluid injector port configured to receive a fluid injector for dispensing a fluid into the exhaust gas for mixing with the exhaust gas in the swirl can plenum mixer and a tangential flow director nozzle configured to dispense the exhaust gas/fluid mixture, through an outlet, into the downstream diffuser plenum in a tangential flow trajectory, wherein mixing and vaporization of the exhaust gas and fluid with and in the exhaust gas is accomplished through ejection of the exhaust gas and fluid from the tangential flow director nozzle and subsequent expansion, deceleration and residence time of the mixture in the downstream diffuser chamber prior to exiting the swirl can plenum mixer canister through an outlet.

The above features and advantages and other features and advantages of the invention are readily apparent from the following detailed description when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
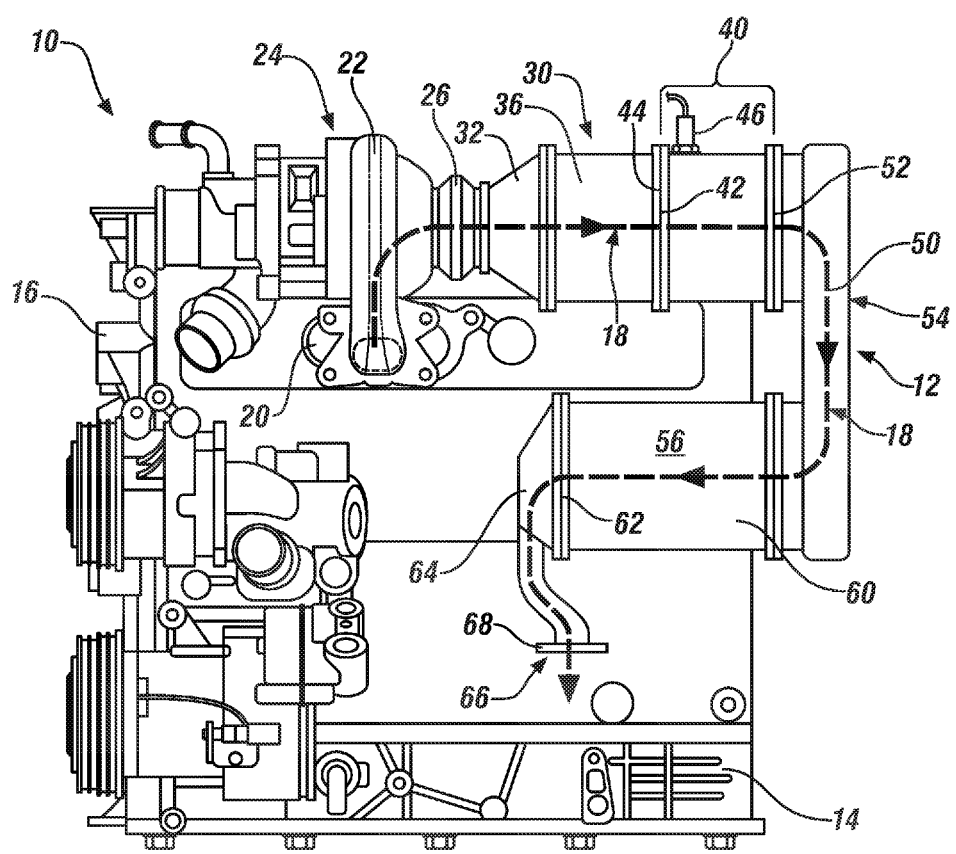
FIG. 1 is a schematic view of an internal combustion engine and associated exhaust treatment system embodying features of the invention.

The following description is merely exemplary in nature and is not intended to limit the present disclosure, its application or uses. It should be understood that throughout the drawings corresponding reference numerals indicate like or corresponding parts and features. In the figures, exhaust flow arrows may be used to indicate general flow direction and not necessarily the detail of flow within a particular exhaust treatment device of the exhaust treatment system.

Referring to FIG. 1, an internal combustion ("IC") engine is illustrated. It should be noted that the invention disclosed herein has application to any type of internal combustion engine requiring an exhaust treatment system in which a fluid such as hydrocarbon ("HC") or urea (or other ammonia ("NH3") containing fluid or gas) is injected. In the description below, a diesel engine 10 and associated exhaust treatment system 12 is described. The diesel engine comprises a cylinder block 14 and a cylinder head 16 which, when combined, define piston cylinders and combustion chambers (not shown). Reciprocating pistons (not shown) are disposed in the piston cylinders and are operable to compress air which combusts when compressed and mixed with an injected fuel in a manner well known in the art. Products of combustion, or exhaust gas 18, exits the cylinder head 16 through exhaust port 20 (which may be associated with an exhaust manifold (not shown)) that, in the exemplary embodiment shown, leads to the exhaust turbine side 22 of an exhaust driven turbocharger 24. The exhaust gas spins an impeller (not shown) which is rotatably mounted within the exhaust turbine side of the turbocharger and subsequently exits the turbocharger through an exit port 26. The exit port is in fluid communication with the exhaust treatment system 12 and exhaust gas 18 departing the turbocharger 24 through the exit port 26 is transferred thereto.

The exhaust treatment system 12 may comprise one of many configurations depending upon the particular application of the engine 10 and its installation (i.e. vehicle, stationary etc.). In the configuration shown in FIG. 1, exhaust gas 18 exiting the exhaust driven turbocharger 24 enters an oxidation catalyst ("OC") device 30 through an inlet cone 32 that is in fluid communication with the exit port 26. The OC device 30 may include, for example, a flow-through metal or ceramic monolith substrate that is packaged in a stainless steel shell or canister 36 having an inlet and an outlet in fluid communication with the exhaust gas 18 in the exhaust treatment system 12. The substrate typically may include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combinations thereof. The OC device 30 is useful in treating unburned gaseous and non-volatile HC and CO, which are oxidized to form carbon dioxide and water. In the exemplary embodiment, a swirl can plenum mixer 40 is located immediately downstream of the DOC device 30 and is configured to receive exhaust gas exiting the DOC device. In the exemplary embodiment illustrated the outlet 42 of the DOC device and the inlet 44 of the swirl can plenum mixer 40 are configured with similar diameters to thereby provide a leak-free seal thereabout, impose little or no restriction upon the flow of exhaust gas 18 and to maximize plenum volume for increased exhaust gas residence time therein. A reductant fluid injector 46 is mounted adjacent to the inlet 44 of the swirl can plenum mixer 40 and injects an ammonia ("NH3") based reductant 48, FIG. 2, into the flow of the exhaust gas 18 as it enters the device. The mixer operates to vaporize the reductant 48 and to mix it with the exhaust gas 18 in a manner that will be further described below.

Following mixing of the reductant 48 with the exhaust gas 18 in the swirl can plenum mixer 40, the exhaust gas/reductant mixture 50 departs the mixer through the mixer outlet 52 and is transported through an exhaust gas conduit 54 to a Selective Catalytic Reduction ("SCR") device 56 disposed below and in parallel alignment with the OC device 30. The SCR device 56 may include, for example, a flow-through metal or ceramic monolith substrate that is packaged in a stainless steel shell or canister 60 having an inlet and an outlet in fluid communication with the exhaust gas/reductant mixture 50 in the exhaust gas conduit 54. An SCR catalyst composition disposed in the SCR device preferably contains a zeolite and one or more base metal components such as iron ("Fe"), cobalt ("Co"), copper ("Cu") or vanadium ("V") which can operate efficiently to reduce $NO_x$ constituents in the exhaust gas 18 in the presence of the ammonia ("NH3") based reductant. The outlet 62 of the SCR device 56 may comprise an exhaust gas collector such as exit cone 64 having an outlet 66 configured with a flange member 68 that allows the exhaust treatment system 12 to be fluidly connected to an exhaust gas conduit (not shown) that will conduct the exhaust gas to additional exhaust treatment devices (if installed) and subsequently to the atmosphere.

Figure 2:
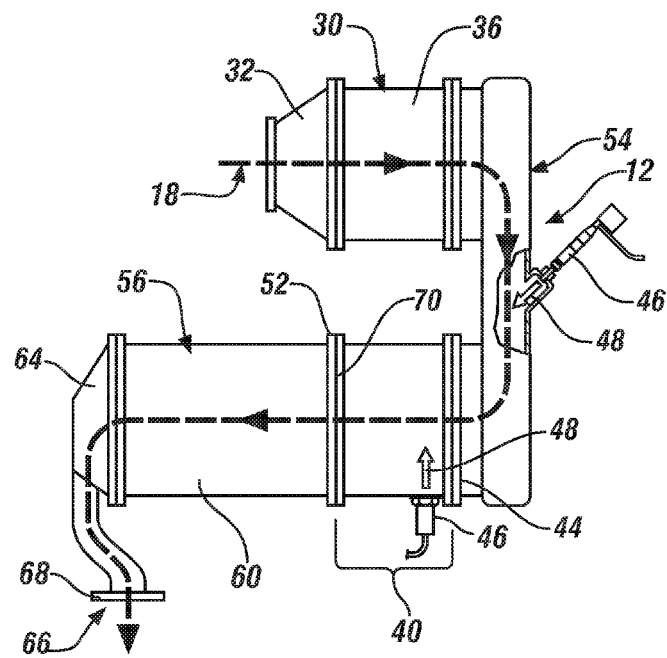
FIG. 2 is a schematic view of another embodiment of an automotive exhaust treatment system embodying features of the invention.

Referring to FIG. 2, in another embodiment of the exhaust treatment system 12, the OC device 30 and the SCR device 56 continue to be mounted in a parallel manner as described above with the exhaust gas 18 transferred between the devices by exhaust gas conduit 54. In the embodiment illustrated however, the swirl can plenum mixer 40 is disposed directly upstream of the SCR device 56 and is configured to receive exhaust gas exiting the exhaust gas conduit 54. In the exemplary embodiment illustrated the outlet 52 of the swirl can plenum mixer and the inlet 70 of the SCR device 56 are configured with similar diameters to thereby provide a leak-free seal thereabout, impose little or no restriction upon the flow of exhaust gas 18 and to maximize plenum volume for increased exhaust gas residence time therein. A reductant fluid injector 46 is mounted adjacent to the inlet 44 of the swirl can plenum mixer 40 and injects an ammonia ("NH3") based reductant 48 into the flow of the exhaust gas 18 as it enters the device. In an alternative embodiment also shown in FIG. 3, the reductant fluid injector 46 may be mounted along the length of the exhaust gas conduit 54. The choice of injector installation may be application dependent. The mixer 40 operates to vaporize the reductant 48 and to mix it with the exhaust gas 18 in a manner that will be further described below.

Figure 3:
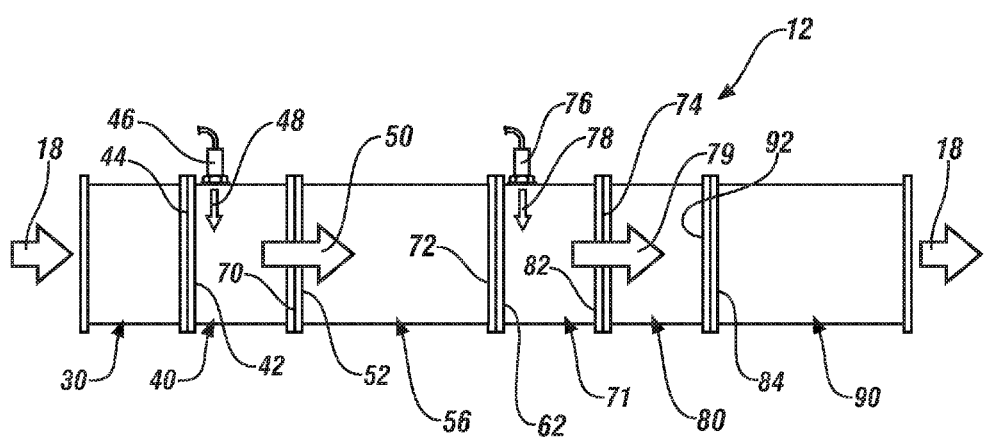
FIG. 3 is a schematic view of yet another embodiment of an automotive exhaust treatment system embodying features of the invention.

Referring to FIG. 3, another exemplary embodiment of the exhaust treatment system 12 illustrates an in-line style system. In the configuration shown exhaust gas 18 enters an OC device 30 where, as indicated, unburned gaseous and non-volatile HC and CO are oxidized to form carbon dioxide and water. In the exemplary embodiment, the swirl can plenum mixer 40 is located immediately downstream of the OC device 30 and is configured to receive exhaust gas 18 exiting the OC device. In the exemplary embodiment illustrated the outlet 42 of the DOC device and the inlet 44 of the swirl can plenum mixer 40 are configured with similar diameters to thereby provide a leak-free seal thereabout while imposing little or no restriction upon the exhaust gas flow. A reductant fluid injector 46 is mounted adjacent to the inlet 44 of the swirl can plenum mixer 40 and injects an ammonia ("NH3") based reductant 48 into the flow of the exhaust gas 18 as it enters the device. The mixer operates to vaporize the reductant 48 and to mix it with the exhaust gas 18 in a manner that will be further described below.

Following mixing of the reductant 48 with the exhaust gas 18 in the swirl can plenum mixer 40, the exhaust gas/reductant mixture 50 departs the mixer through the mixer outlet 52 and enters a Selective Catalytic Reduction ("SCR") device 56. The outlet 52 of the swirl can plenum mixer and the inlet 70 of the SCR device 56 are configured with similar diameters to thereby provide a leak-free seal thereabout, impose little or no restriction upon the flow of exhaust gas 18 and to maximize plenum volume for increased exhaust gas residence time therein. The SCR device 56 operates to reduce $NO_x$ constituents in the exhaust gas in the presence of the ammonia ("NH3") based reductant 48 and the exhaust gas exits the SCR device through outlet 62. In the exemplary embodiment illustrated, a second swirl can plenum mixer 71 is located immediately downstream of the SCR device 56 and is configured to receive exhaust gas exiting the SCR device. In the exemplary embodiment illustrated the outlet 62 of the SCR device 56 and the inlet 72 of the second swirl can plenum mixer 71 are configured with similar diameters to thereby provide a leak-free seal thereabout, impose little or no restriction upon the flow of exhaust gas 18 and to maximize plenum volume for increased exhaust gas residence time therein. A hydrocarbon fluid injector ("HC" injector) 76 is mounted adjacent to the inlet 72 of the second swirl can plenum mixer 71 and injects a liquid hydrocarbon 78 into the flow of the exhaust gas as it enters the device. The mixer operates to vaporize the liquid hydrocarbon 78 and to mix it with the exhaust gas in a manner that will be further described below. Following mixing of the liquid hydrocarbon 78 with the exhaust gas in the swirl second can plenum mixer 71, the exhaust gas/hydrocarbon mixture 79 departs the mixer through the mixer outlet 74 and enters a second OC device 80. The outlet 74 of the second swirl can plenum mixer 71 and the inlet 82 of the second OC device 80 are configured with similar diameters to thereby provide a leak-free seal thereabout, impose little or no restriction upon the flow of exhaust gas 18 and to maximize plenum volume for increased exhaust gas residence time therein. The exhaust gas/hydrocarbon mixture 79 is oxidized in the second OC device 80 resulting in an exothermic reaction that raises the temperature of the exhaust gas. The heated exhaust gas travels downstream to a Particulate Filter ("PF") device 90 device to thereby burn (oxidize) particulate accumulation in a known manner. The outlet 84 of the second OC device 80 and the inlet 92 of the PF device 90 are configured with similar diameters to thereby provide a leak-free seal thereabout while imposing little or no restriction upon the exhaust gas flow.

Figure 4:
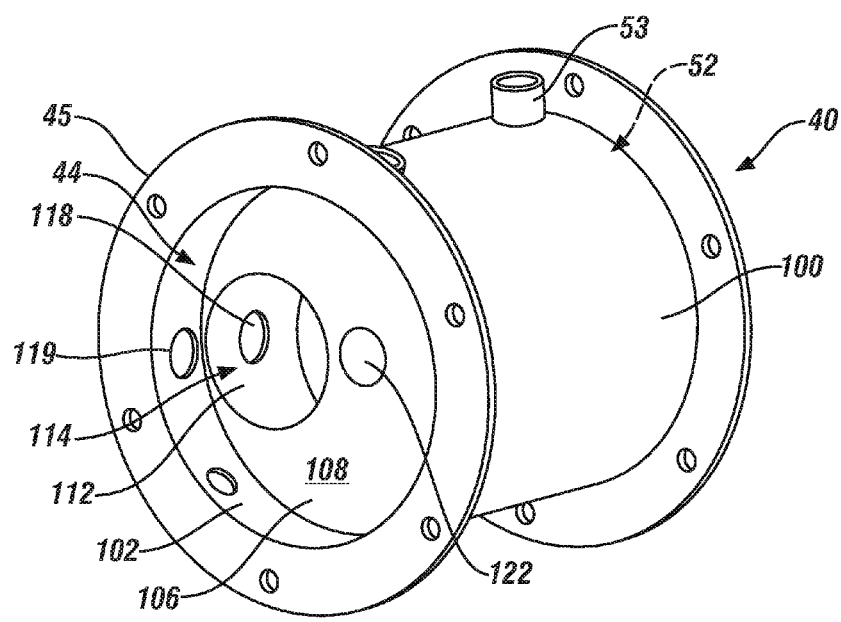
FIG. 4 is a perspective upstream end view of a compact mixing plenum embodying features of the invention.
Figure 5:
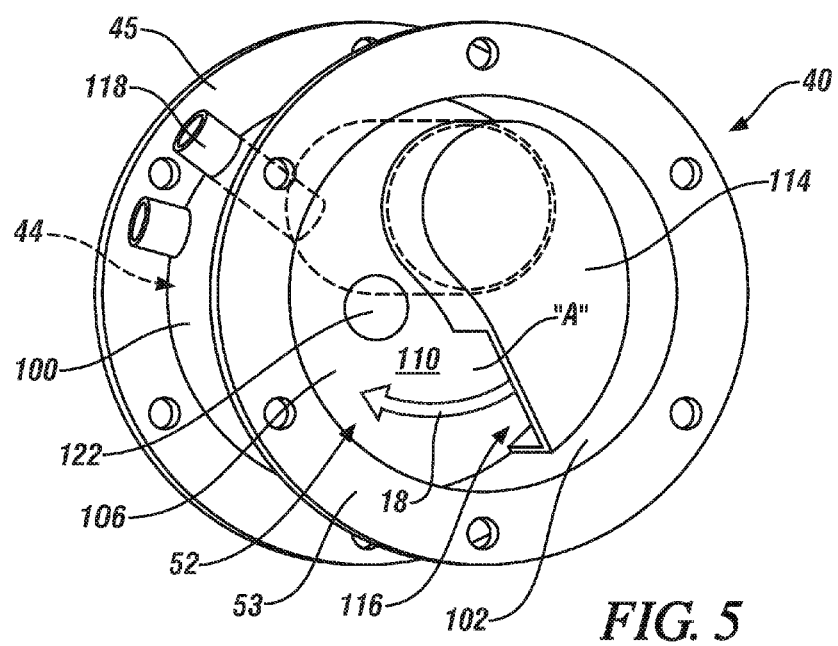
FIG. 5 is a perspective downstream end view of the compact mixing plenum embodying features of the invention.

Referring to FIGS. 4 and 5, in an exemplary embodiment, a swirl can plenum mixer 40 (this description applies equally to second swirl can plenum mixer 70) is illustrated. The mixer comprises a rigid canister 100 having an inlet 44 and an outlet 52. Flanges 45 and 53 may extend about the inlet and outlet 44, 52, respectively and are configured for sealing attachment of the mixer to other upstream and downstream components of the exhaust treatment system 12. The canister 100 has an inner wall 102 that defines an inner exhaust gas plenum that is divided by a bulkhead 106. The bulkhead separates the inner exhaust gas plenum into an upstream exhaust gas collector 108 and a downstream diffuser chamber 110. A primary flow port 112, opens through the bulkhead 106 and, in an exemplary embodiment, is located in an off-of-center location adjacent to the outer diameter of the inner exhaust gas plenum. Exhaust gas 18 entering the swirl can plenum mixer 40 through inlet 44 is concentrated and accelerated through the primary flow port 112 as it moves into the mixer. Disposed about, and in fluid communication with, the primary flow port 112 on the downstream side of the bulkhead 106 is a tangential flow director 114. The tangential flow director collects the exhaust gas 18 passing through the primary flow port 112 and dispenses it into the downstream diffuser chamber 110 through an outlet 116 that is configured and located to place the exhaust gas on a tangential flow trajectory therein. In the exemplary embodiments shown, the outlet 116 of the tangential flow director 114 may be configured as a flow nozzle having an area "A" that is smaller than the area of the primary flow port 112. The result is a further acceleration of the exhaust gas 18 tangentially about the outside circumference of the downstream diffuser chamber 110 moving heavier, un-vaporized liquid towards the outside of the canister 100 and thereby providing increased residence time of the exhaust gas/liquid mixture within the downstream diffuser chamber 110 and, as a result, improving mixture and vaporization within the swirl can plenum mixer 40.

In exemplary embodiments, a fluid injector port 118 is disposed at one or more locations and is configured to receive a fluid injector such as reductant fluid injector 46 or hydrocarbon fluid injector 76 for dispensing ammonia based reductant 48 or liquid hydrocarbon 78, for instance, into the exhaust gas 18 for mixing with the exhaust gas in the swirl can plenum mixer 40. In embodiments the fluid injector port 118 may be located in the upstream exhaust gas collector 108 adjacent to the primary flow port 112 or, as illustrated in FIG. 4 in the tangential flow director 114 downstream of and adjacent to the primary flow port 112. The precise location of the fluid injector port 118 will be determined by the particular application and flow characteristics of the specific swirl can plenum mixer. Other locations for the fluid injector ports, such as locations upstream of the swirl can plenum mixer 40, are also contemplated. Location of the fluid injector ports 118 in a location close to the primary flow port 112 and the tangential flow director 114 allows for significant mixing of the injected fluid 48, 78 with the exhaust gas 18 as it accelerates and changes direction through the primary flow port 112 and the tangential flow director 114. Final mixing and vaporization of the fluid with and in the exhaust gas is accomplished through ejection of the exhaust gas/fluid mixture from the tangential flow director nozzle 116 and subsequent expansion, deceleration (i.e. reduction in the Bulk Volume Flow Rate) and residence time of the mixture in the downstream diffuser chamber 110 prior to exiting the swirl can plenum mixer canister 100 through the outlet 52. A sensor port 119 may be located upstream of the injector port 118, such as in the upstream gas collector 108 adjacent to the primary flow port 112 and is configured to receive a sensor such as a NOx sensor, a CO sensor or a temperature sensor (not shown) that is useful in determining the quantity of reductant or hydrocarbon required to be injected by the reductant fluid injector 46 or the hydrocarbon fluid injector 76.

To offset exhaust system restriction, or pressure drop imposed by the tangential flow director 114, particularly at high exhaust flow rates, in an exemplary embodiment one or more optional flow bypass ports 122 may be located in the bulkhead 106. The port(s) 122 may be advantageously located in the center the bulkhead or offset from the primary flow port, and is sized to reduce the exhaust system pressure drop while maintaining mixing performance by assuring that virtually all of the injected fluid passes into and through the tangential flow director nozzle 116 The use of the optional flow bypass ports 122 may require alternate injector locations and/or baffles to direct the fluid flow to the primary flow port 112.

Figure 6:
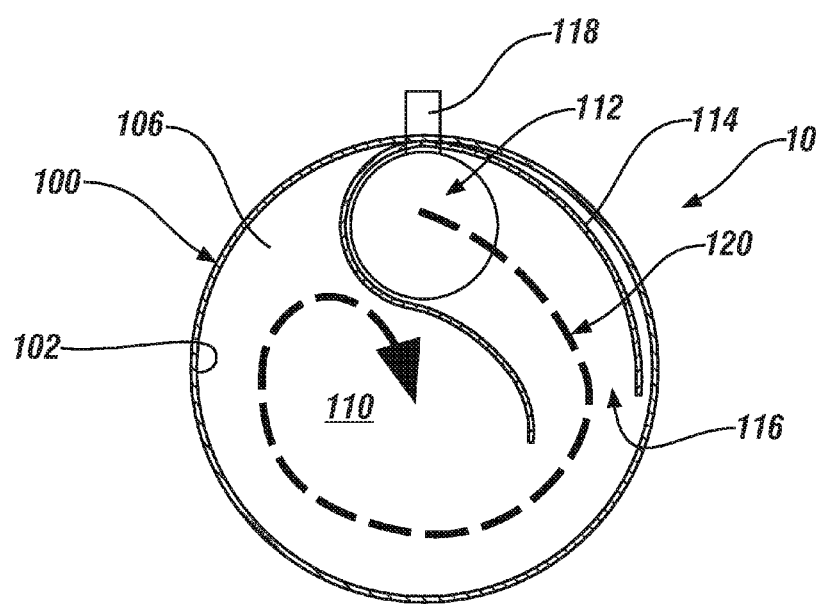
FIG. 6 is a schematic downstream end view of an embodiment of the compact mixing plenum embodying features of the invention.

In an exemplary embodiment illustrated in FIG. 6 the tangential flow director 114 may be configured to extend adjacent to the inner wall 102 of the swirl can plenum mixer canister 100. In such a configuration the exhaust gas/fluid mixture 120 exiting the tangential flow director nozzle 116 will transit the outside circumference of the downstream diffuser chamber 110 and impact the tangential flow director 114 disrupting the swirl effect imposed on the exhaust gas/fluid mixture and moving the mixture in the downstream direction of the canister 100. In another exemplary embodiment illustrated in FIG. 7, the tangential flow director 114 may be spaced from the inner wall 102 of the swirl can plenum mixer canister 100 to allow the exhaust gas/fluid mixture 120 exiting the tangential flow director nozzle 116 undisturbed swirl about the inner wall 102 thereby increasing residence time of the mixture 120 within the exhaust gas plenum 110.

Figure 8:
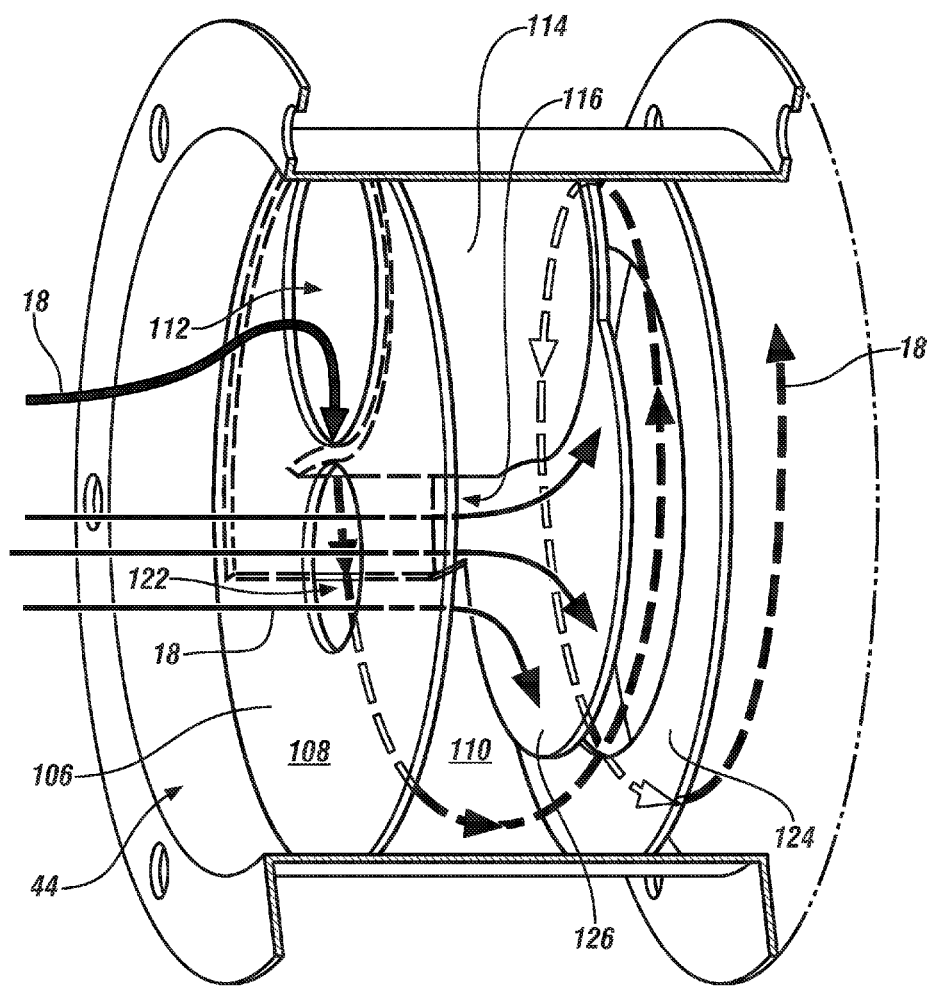
FIG. 8 is a perspective view of another exemplary embodiment of the compact mixing plenum embodying features of the invention.

To offset performance loss at higher flow rates due to faster flow transport through the exhaust treatment system 12, a circular center-hole diffusion plate 124, FIG. 8, may be disposed within the downstream diffuser chamber 110. The center-hole diffusion plate 124 is configured to hold any un-evaporated liquid in the exhaust gas plenum for a longer period of time to allow evaporation to occur (i.e. increase residence time of exhaust gas/fluid mixture). Additionally, a periphery plate 126 may be disposed within the downstream diffuser chamber 110 in order to define a torturous path 128 for the exhaust gas 18 as it moves downstream further increasing evaporation of any remaining liquids.

Figure 7:
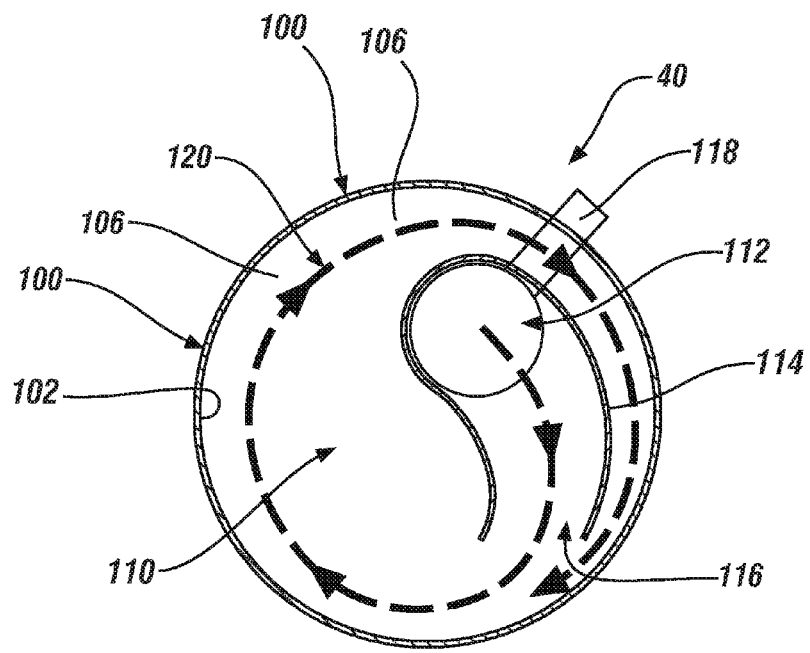
FIG. 7 is a schematic downstream end view of a another embodiment of the compact mixing plenum embodying features of the invention.

Referring to FIG. 8 with continuing reference to FIGS. 6 and 7, in an exemplary embodiment, exhaust gas 18 from internal combustion engine 10 enters the upstream exhaust gas collector 108 through the mixer inlet 44. Upon entering the upstream exhaust gas collector, the exhaust gas 18 passes through primary flow port 112 and, as it moves through the port, a fluid such as an ammonia based reductant 48 or a hydrocarbon liquid 78 is injected by an injector disposed in fluid injector port 118 which is located in close proximity to the primary flow port 112. The exhaust gas/fluid mixture is concentrated and accelerated through the primary flow port 112 as it moves into the mixer. Disposed about and in fluid communication with the primary flow port 112 on the downstream side of the bulkhead 106 the tangential flow director 114 collects the exhaust gas 18 passing through the primary flow port 112 and dispenses it into the downstream diffuser plenum 104 through the outlet 116 that is configured to place the exhaust gas on a tangential flow trajectory therein. The result is a further acceleration of the exhaust gas tangentially about the outside circumference of the downstream diffuser chamber 110 thereby providing increased residence time of the exhaust gas within the exhaust gas plenum 104 and, as a result, the swirl can plenum mixer canister 100 prior to its exit through outlet 52.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A swirl can plenum mixer for mixing injected fluid with exhaust gas exhausted from an internal combustion engine comprising:
   a canister having an inlet and an outlet;
   an inner exhaust gas plenum;
   a bulkhead separating the inner exhaust gas plenum into an upstream exhaust gas collector and a downstream diffuser chamber;
   a primary flow port having a first area opening through the bulkhead;
   a tangential flow director disposed about, and in fluid communication with, the primary flow port on the downstream side of the bulkhead to collect the exhaust gas passing through the primary flow port;
   a fluid injector port configured to receive a fluid injector for dispensing a fluid into the exhaust gas;
   a tangential flow director nozzle radially off-set relative to the primary flow port, the tangential flow director nozzle having an outlet including a second area that is less than the first area configured to dispense exhaust gas and fluid into the downstream diffuser plenum in a tangential flow trajectory, wherein mixing and vaporization of the exhaust gas and fluid is accomplished through ejection of the exhaust gas and fluid mixture from the tangential flow director nozzle and subsequent expansion, deceleration and residence time of the mixture in the downstream diffuser chamber prior to exiting the swirl can plenum mixer canister through an outlet.

2. The swirl can plenum mixer of claim 1, further comprising a flow bypass port located in the bulkhead.

3. The swirl can plenum mixer of claim 1, wherein the tangential flow director extends adjacent to an inner wall of the swirl can plenum mixer canister to direct exhaust gas and fluid mixture exiting the tangential flow director nozzle along the outside circumference of the downstream diffuser chamber to impact the tangential flow director disrupting the swirl effect imposed on the exhaust gas/fluid mixture and moving the mixture in the downstream direction of the canister.

4. The swirl can plenum mixer of claim 1, wherein the tangential flow director is spaced from an inner wall of the swirl can plenum mixer canister to the exhaust gas and fluid mixture exiting the tangential flow director nozzle about the inner wall of the swirl can plenum mixer canister to thereby increase residence time of the mixture within the exhaust gas plenum.

5. The swirl can plenum mixer of claim 2, further comprising a circular center-hole diffusion plate disposed within the downstream diffuser chamber and configured to hold any un-evaporated fluid in the downstream diffuser chamber until evaporation occurs.

6. The swirl can plenum mixer of claim 1, further comprising a periphery plate disposed within the downstream diffuser chamber and configured to define a torturous path for the exhaust gas and fluid mixture as it moves downstream.

7. The swirl can plenum mixer of claim 1, wherein the fluid is one of a liquid hydrocarbon or an ammonia based reductant.

8. An internal combustion engine having an exhaust treatment system with a fluid injection system and a swirl can plenum mixer for mixing injected fluid with exhaust gas exhausted from the engine, the swirl can plenum mixer comprising:
   a canister having an inlet and an outlet;
   an inner exhaust gas plenum;
   a bulkhead separating the inner exhaust gas plenum into an upstream exhaust gas collector and a downstream diffuser chamber;
   a primary flow port having a first area opening through the bulkhead;
   a tangential flow director disposed about, and in fluid communication with, the primary flow port on the downstream side of the bulkhead to collect the exhaust gas passing through the primary flow port;
   a fluid injector port configured to receive a fluid injector for dispensing a fluid into the exhaust gas for mixing with the exhaust gas in the swirl can plenum mixer;
   a tangential flow director nozzle radially off-set relative to the primary flow port, the tangential flow director nozzle having an outlet including a second area that is less than the first area configured to dispense exhaust gas and fluid into the downstream diffuser plenum in a tangential flow trajectory thereabout, wherein mixing and vaporization of the exhaust gas and fluid is accomplished through ejection of the exhaust gas and fluid mixture from the tangential flow director nozzle and its subsequent expansion, deceleration and residence time in the downstream diffuser chamber prior to exiting the swirl can plenum mixer canister through an outlet.

9. The internal combustion engine of claim 1, further comprising a flow bypass port located in the bulkhead at the center of the bulkhead, or offset from the primary flow port.

10. The internal combustion engine of claim 1, wherein the tangential flow director extends adjacent to an inner wall of the swirl can plenum mixer canister to direct exhaust gas and fluid exiting the tangential flow director nozzle along an outside circumference of the downstream diffuser chamber to thereby impact the tangential flow director disrupting the swirl effect imposed on the exhaust gas/ and fluid mixture.

11. The internal combustion engine of claim 1, wherein the tangential flow director is spaced from an inner wall of the swirl can plenum mixer canister to direct the exhaust gas and fluid exiting the tangential flow director nozzle about the inner wall of the downstream diffuser chamber to thereby increase residence time of the mixture within the exhaust gas plenum.

12. The internal combustion engine of claim 1, further comprising a circular center-hole diffusion plate disposed within the downstream diffuser chamber and configured to hold any un-evaporated fluid in the downstream diffuser chamber until evaporation occurs.

13. The internal combustion engine of claim 1, further comprising a periphery plate disposed within the downstream diffuser chamber and configured to define a torturous path for the exhaust gas and fluid as it moves downstream.

14. The internal combustion engine of claim 1, further comprising an Oxidation Catalyst device located downstream of the swirl can plenum mixer and configured to receive the exhaust gas and fluid therefrom for oxidation therein.

15. The internal combustion engine of claim 14, wherein the fluid is a liquid hydrocarbon.

16. The internal combustion engine of claim 1, further comprising a Selective Catalytic Reduction device located downstream of the swirl can plenum mixer and configured to receive the exhaust gas and fluid therefrom.

17. The internal combustion engine of claim 16, wherein the fluid is an ammonia based reductant.

* * * * *